United States Patent [19]

Plotkin

[11] Patent Number: 4,500,236

[45] Date of Patent: Feb. 19, 1985

[54] ENGRAVING APPARATUS

[75] Inventor: Victor Plotkin, Brooklyn, N.Y.

[73] Assignee: New Hermes Incorporated, New York, N.Y.

[21] Appl. No.: 314,610

[22] Filed: Oct. 26, 1981

[51] Int. Cl.[3] .............................................. B23C 1/16

[52] U.S. Cl. ...................................... 409/86; 33/25 B; 409/92

[58] Field of Search ....................... 409/86, 89, 92, 93, 409/126; 33/25 B, 25 R, 25 C, 25 D, 25 E

[56] References Cited

U.S. PATENT DOCUMENTS 295,853 3/1884 Beam ................................. 33/25 R
695,069 3/1902 Martin ............................... 33/25 R
834,470 10/1906 Hanssen ............................. 33/25 B
938,936 11/1909 Ziegler ............................. 409/86 X
2,674,042 4/1954 Ott ...................................... 33/25 B
2,762,126 9/1956 Shaw ........................................ 33/31
3,570,129 3/1971 Del Vecchio ...................... 33/25 B
4,174,572 11/1979 Mikulin ................................... 33/31
4,369,701 1/1983 Richardson et al. .............. 33/25 D

FOREIGN PATENT DOCUMENTS 260211 10/1926 United Kingdom .............. 33/25 D

*Primary Examiner*—William R. Briggs
*Attorney, Agent, or Firm*—Seidel, Gonda & Goldhammer

[57] ABSTRACT

An engraving spindle assembly is removably mounted on one of two links of pantograph to change the magnification of indicia to be engraved on a work piece. The spindle assembly is pivotable about the mounting means on each of said links to facilitate lefthand or righthand operation.

8 Claims, 3 Drawing Figures

ENGRAVING APPARATUS

BACKGROUND

For a typical engraving machine, see U.S. Pat. No. 3,830,136. The machine is quite large and comprised of a large number of components. A simpler machine is disclosed in U.S. Pat. No. 3,496,795. There is a need for a simple inexpensive engraving apparatus for engraving on metal work pieces and having a simple, inexpensive construction facilitating changing the magnification of the indicia to be engraved. The present invention is directed to a solution of that problem.

SUMMARY OF THE INVENTION

The present invention is directed to an engraving apparatus having a pantograph. The pantograph supports a stylus for tracing indicia to be engraved. A spindle assembly including a spindle for engraving indicia is supported directly by the pantograph. Two discrete links of the pantograph each have means thereon for mounting the spindle assembly at locations which change the magnification of the indicia to be engraved. The assembly is manually movable from one mounting means to the other. A work holder is provided for holding work to be engraved at locations adjacent each mounting means.

It is an object of the present invention to provide a novel, simple and inexpensive engraving apparatus with a provision for changing the magnification of indicia being engraved.

It is another object of the present invention to provide a simple, inexpensive and reliable engraving apparatus for manually engraving work pieces in a manner which accomodates lefthand and righthand actuation by an operator.

Other objects and advantages will appear hereinafter.

For the purpose of illustrating the invention, there is shown in the drawing a form which is presently preferred; it being understood, however, that this invention is not limited to the precise arrangements and instrumentalities shown.

DETAILED DESCRIPTION

Figure 1:
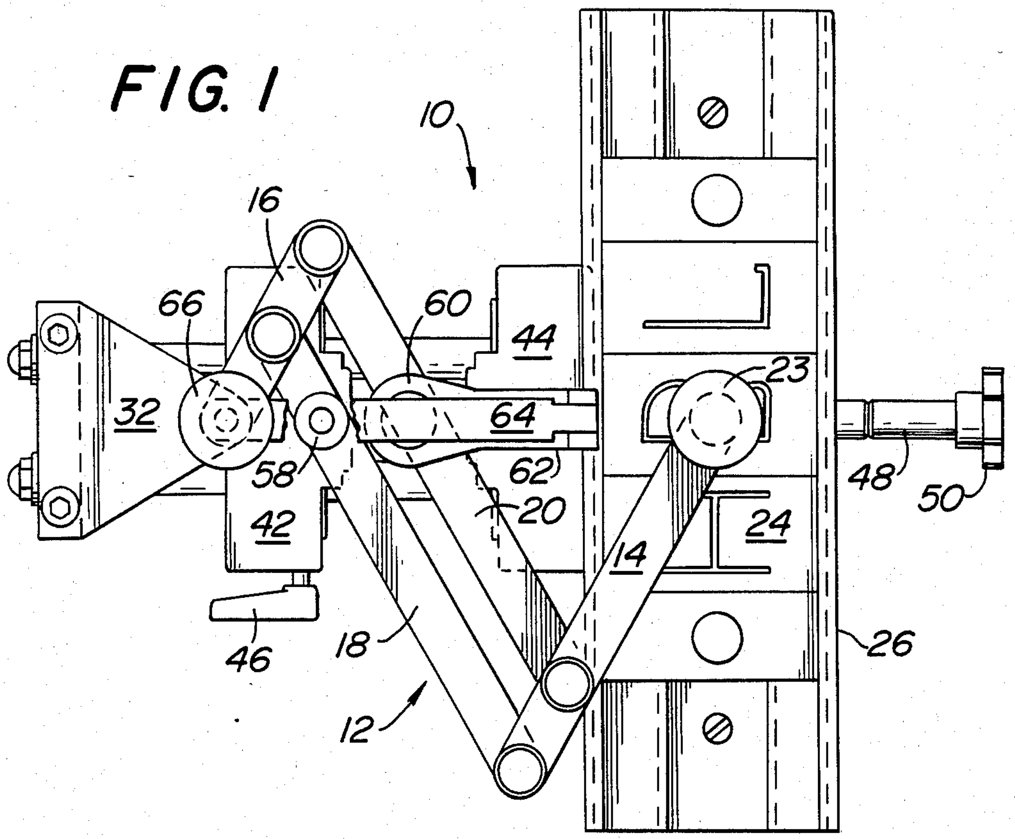
FIG. 1 is a top plan view of the apparatus of the present invention.

Referring to the drawing in detail, wherein like numerals indicate like elements, there is shown in the figures of the drawing engraving apparatus in accordance with the present invention designated generally as 10.

The apparatus 10 includes a parallelogram type pantograph designated generally as 12. The pantograph 12 includes parallel links 14 and 16 pivotably connected to parallel links 18 and 20. Links 18 and 20 are of the same length while link 14 is substantially longer than link 16. Link 14 terminates at one end in a vertically disposed stylus 22. See FIG. 2. The stylus 22 is supported in a bearing at the end of link 14 and has a knob 23 which is spring biased upwardly.

Below the stylus 22, there is provided a support member 26 for supporting indicia 24 to be traced by the stylus 22. Manual pressure is applied to the knob 23 to cause the stylus 22 to descend to a location where it may trace the indicia 24. The indicia 24 may be letters of the alphabet, design, etc.

Figure 3:
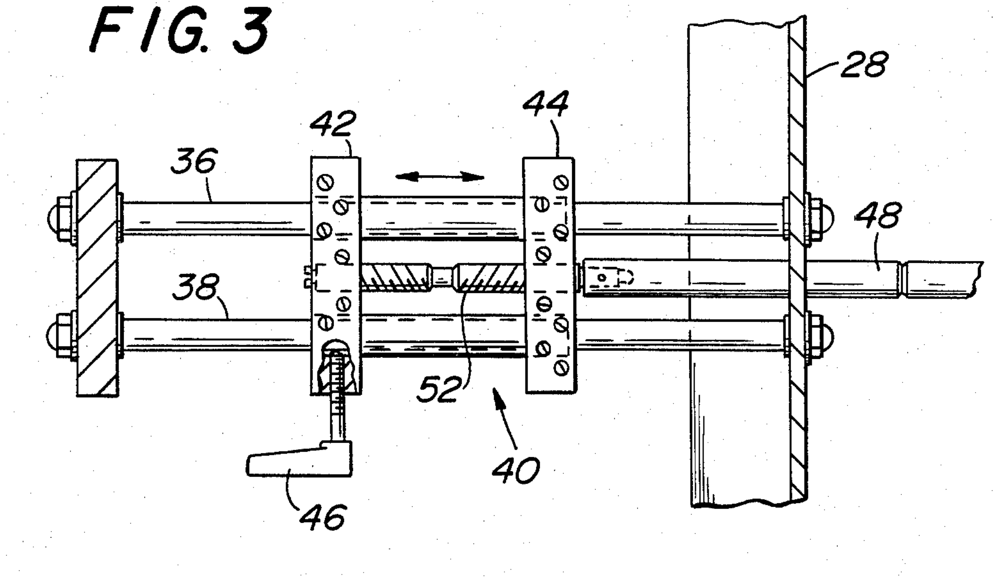
FIG. 3 is a sectional view taken along the line 3—3 in FIG. 2.
Figure 2:
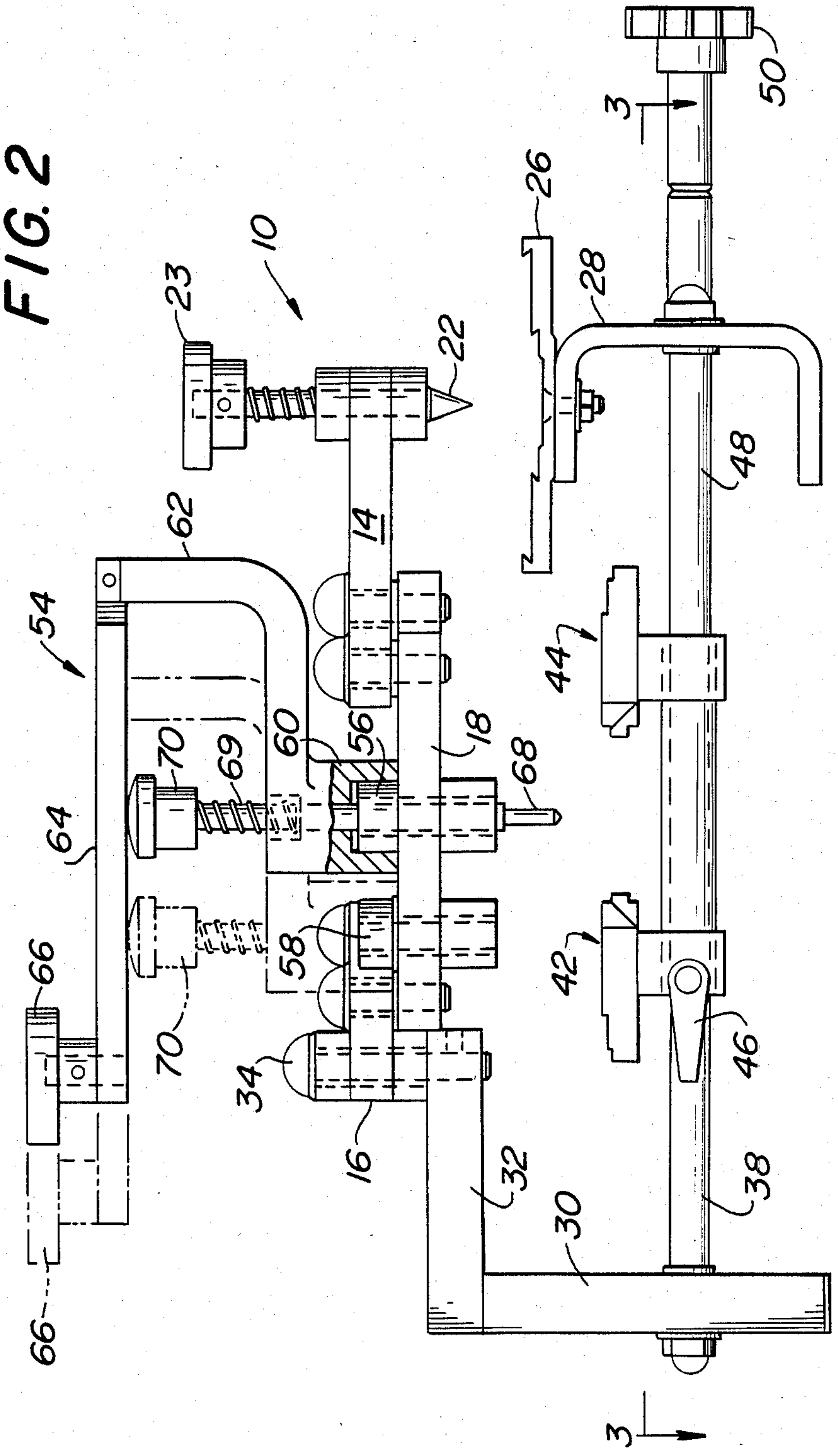
FIG. 2 is an side view of the apparatus of the present invention.

The support member 26 is mounted on a front frame portion 28. Portion 28 is preferably C-shaped in cross-section as shown in FIG. 2 to thereby provide a horizontally disposed bottom leg for support on a table or the like. The apparatus 10 includes a frame rear portion 30 which is vertically disposed and adapted to rest on a table or the like. The pantograph 12 is supported by the portion 32. In this regard, the link 16 is secured to portion 32 by means of pivot pin 34 and spaced bearings. The front and rear portions 28 and 30 respectively are coupled together by horizontally disposed parallel guide rails 36, 38. See FIG. 3. The size of the apparatus 10 will be apparent from the rails 30, 32 being short in length, such as 9 inches and each of the links 18, 20 having a length of about 6 inches. Such dimensions may be modified as desired.

A work holder designated generally as 40 is provided below the elevation of the pantograph 12. Work holder 40 includes a first portion 42 and a second portion 44. Portion 42 may be locked to the rail 38 by way of handle 46 connected to a set screw. The portions 42, 44 are movable towards and away from each other by means of an actuator shaft 48 having a knob 50 at one end. The other end of shaft 48 is connected to a turn buckle 52. Turn buckle 52 has threads of opposite type at each end, with each of the threads being threaded to one of the portions 42, 44. Hence, rotation of knob 50 in one direction will move the portions 42, 44 towards each other and visa versa.

A spindle assembly 54 is provided. Spindle assembly 54 can be mounted in two different positions on the pantograph 12 from the solid line position to the phantom position. As shown in solid lines in FIG. 2, the spindle assembly 54 is positioned at mount 54 on the link 20. A mount 58 is provided on the link 18. The distance from link 16 and mount 58 is ½ of the distance between link 16 and mount 56. Hence, when the spindle assembly 54 is positioned at mount 56 the magnification is 2½ to 1 and 5 to 1 when the spindle assembly is located at mount 58.

The mounts 56, 58 are preferably in the form of an upstanding boss on their respective pantograph links with a centrally disposed hole. The spindle assembly 54 includes a hub 60 which telescopes over mount 56 or mount 58. Assembly 54 is rotatable through an arc of approximately 180°, that is clockwise 90° from the position shown in FIG. 1 and counterclockwise 90° from the position shown in FIG. 1. The hub 60 includes an upstanding arm 62 pivotably connected to one end of the lever 64. Lever 64 terminates in a knob 66.

An engraving tool 68 is supported by the assembly 54. The engraving tool 68 is supported at one end of tool 69 which extends through the hub 60, through the hole in the mount 56, and through a boss on the bottom of the link 20. Tool 69 at its upper end is provided with a knob 70. A spring extends between the knob 70 and hub 60 thereby biassing the spindle to the uppermost or inoperative position as shown in FIG. 2.

The apparatus 10 is utilized as follows. The desired indicia 24 is removably attached to the support member 26 in a conventional manner. A work piece to be engraved is clamped to the portions 42, 44 by rotation of the knob 50 in the appropriate direction. Pressure is applied downwardly on knob 66 by one hand of the operator while the other hand of the operator is utilized to minipulate the stylus 22. Downward pressure on knob 66 moves the engraving tool 68 in an axial direction downwardly into contact with the metal work piece to be engraved. The entire assembly 54 may be pivoted to accomodate the best position for the operator depending upon whether he is lefthanded or righthanded.

In order to convert from one magnification to another the spindle assembly 54 is manually elevated and then repositioned at the mount 58. Conversion from one magnification to another is rapid, fool proof, and requires only seconds. This is a significant advantage over a conventional engraving machine where the spindle and ratio links must be lined up to their individual scales by eye whereby it is time consuming and if care is not exercised can result in an inaccuracy. The entire apparatus is quite small so as to facilitate small jobs which do not justify the cost of substantial investment in large commercially usable engraving machines having motor driven spindles, numerous elements, etc.

The present invention may be embodied in other specific forms without departing from the spirit or essential attributes thereof and, accordingly, reference should be made to the appended claims, rather than to the foregoing specification, as indicating the scope of the invention.

I claim:

1. Engraving apparatus comprising a frame, a pantograph supported by the frame, the pantograph supporting a stylus for tracing indicia to be engraved, a spindle assembly including a spindle for engraving indicia, two discrete links of said pantograph each having means thereon for mounting the spindle assembly at locations which change the magnification of the indicia to be engraved, said assembly being manually movable from one mounting means to the other mounting means, said assembly including a pivotable lever arranged to move the spindle downwardly while the spindle is in each of the locations identified by said mounting means, each mounting means including an upstanding boss, said spindle assembly including a portion which is telescoped with respect to one of said bosses, said mounting means being located on parallel links of the pantograph and wherein said parallel links are each pivotably connected at one end to a link supporting the stylus, means for enabling said spindle assembly to be pivotable through an arc approximately 180° with respect to its mounting boss so as to facilitate application of left-hand or right-hand pressure to the engraving tool, and a work holder capable of holding work to be engraved adjacent each said mounting means.

2. Apparatus in accordance with claim 1 wherein the magnification at one mounting means is a whole number multiple of the magnification at the other mounting means.

3. Engraving apparatus comprising:

(a) a portable frame;

(b) a pantograph supported by the frame, the pantograph supporting a stylus for tracing indicia to be engraved, said pantograph having two parallel links of the same length with each pivotably connected at one end to a link supporting the stylus;

(c) a spindle assembly including a spindle for engraving indicia, said two parallel links of said pantograph each having a boss thereon for mounting the spindle assembly without a fastener at different distances from said one end thereof and which changes the magnification of the indicia to be engraved, said assembly being manually movable from one boss to the other; said assembly including a pivoted lever, means for enabling said spindle assembly to be pivotable through an arc of approximately 180° with respect to each mounting boss so as to facilitate application of left-hand or right-hand pressure to the engraving tool by means of said pivoted lever; and (d) an adjustable holder capable of holding work to be engraved below each boss.

4. Apparatus in accordance with claim 3 wherein the magnification at one boss is a whole number multiple of the magnification at the other boss.

5. Apparatus in accordance with claim 3 wherein said spindle is spring biased upwardly toward the lever.

6. Engraving apparatus comprising:

(a) a frame having a pivot and a support for indicia, said pivot and support being at opposite ends of the frame;

(b) a parallelogram pantograph supported by the frame, the pantograph supporting a stylus for tracing indicia to be engraved, said pantograph having first and second parallel links each pivotably connected at one end to a third link supporting the stylus and at their other end to a fourth link which is connected to said pivot;

(c) a spindle assembly including a spindle for engraving indcia and an annular portion, said first and second parallel links of said pantograph each having a boss thereon for telescopic cooperation with said annular portion at locations which change the magnification of the indicia to be engraved, said assembly including a lever pivoted about a horizontal axis and disposed above said bosses, a spring biasing said spindle upwardly into contact with said lever; and (d) an adjustable holder below each boss and capable of holding work to be engraved.

7. Apparatus in accordance with claim 6 wherein said holder is mounted on rails, said rails extending between and supported at their ends by said opposite ends of the frame.

8. Apparatus in accordance with claim 7 wherein said frame ends are connected together only by said rails.

* * * * *